US005466560A

United States Patent [19]

Sowinski et al.

[11] Patent Number: 5,466,560

[45] Date of Patent: Nov. 14, 1995

[54] LIMITED USE CAMERAS AND FILMS

[75] Inventors: Allan F. Sowinski; Richard P. Szajewski; James P. Merrill, all of Rochester, N.Y.

[73] Assignee: Eastman Kodak Company, Rochester, N.Y.

[21] Appl. No.: 135,700

[22] Filed: Oct. 13, 1993

[51] Int. Cl.[6] .......................... G03C 1/005; G03C 1/035; G03B 17/28; G03B 17/02

[52] U.S. Cl. .......................... 430/347; 430/567; 430/507; 430/510; 430/957; 354/75; 354/76; 354/354; 354/288

[58] Field of Search .................................... 430/567, 507, 430/510, 347, 957; 354/75, 76, 354, 288; 356/124.5

[56] References Cited

U.S. PATENT DOCUMENTS

| | | | |
|---|---|---|---|
| 2,090,607 | 8/1937 | Baldsiefen | 430/606 |
| 2,527,583 | 10/1950 | Silberstein et al. | 430/507 |
| 2,697,037 | 12/1954 | Jelley et al. | 430/507 |
| 2,956,879 | 10/1960 | Van Campen | 430/561 |
| 3,282,699 | 11/1966 | Jones et al. | 430/518 |
| 3,531,287 | 9/1970 | Salesin | 430/606 |
| 3,630,744 | 12/1971 | Thiours | 430/602 |
| 4,233,399 | 11/1980 | Kitzing et al. | 430/510 |
| 4,388,401 | 6/1983 | Hasebe et al. | 430/505 |
| 4,420,555 | 12/1983 | Krueger et al. | 430/507 |
| 4,439,520 | 3/1984 | Kofron et al. | 430/434 |
| 4,520,098 | 5/1985 | Dickerson | 430/495 |
| 4,539,289 | 9/1985 | Saito et al. | 430/506 |
| 4,582,780 | 4/1986 | Giusto et al. | 430/505 |
| 4,758,852 | 7/1988 | Maejima | 354/75 |
| 4,762,769 | 8/1988 | Takahashi et al. | 430/264 |
| 4,801,525 | 1/1989 | Mihara et al. | 430/518 |
| 4,803,149 | 2/1989 | Takahashi et al. | 430/264 |
| 4,849,326 | 7/1989 | Besio et al. | 430/512 |
| 4,865,964 | 9/1989 | Newmiller | 430/367 |
| 4,871,656 | 10/1989 | Parton et al. | 430/522 |
| 4,948,717 | 8/1990 | Diehl et al. | 430/510 |
| 4,956,269 | 9/1990 | Ikeda et al. | 430/507 |
| 4,977,069 | 12/1990 | Iijima et al. | 430/506 |
| 5,009,988 | 4/1991 | Yagi et al. | 430/505 |
| 5,206,125 | 4/1993 | Ogawa | 430/507 |
| 5,275,929 | 1/1994 | Buitano et al. | 430/567 |
| 5,302,499 | 4/1994 | Merrill et al. | 430/503 |
| 5,308,747 | 5/1994 | Szajewski et al. | 430/507 |

FOREIGN PATENT DOCUMENTS

| | | |
|---|---|---|
| 0246553 | 7/1991 | European Pat. Off. . |
| 1956774 | 6/1971 | Germany . |

OTHER PUBLICATIONS

Research Disclosure, Absorbing and Scattering Materials, No. 308119, Dec. 1989, p. 1003.

*Primary Examiner*—Charles L. Bowers, Jr.
*Assistant Examiner*—Mark F. Huff
*Attorney, Agent, or Firm*—Paul A. Leipold

[57] ABSTRACT

This invention relates to cameras designed for single or limited use. It more particularly relates to cameras that are intended for one use, after which they are recycled, subsequent to removal of the film for development and printing or scanning. The camera and film combinations provide exceptionally sharp images.

40 Claims, No Drawings

LIMITED USE CAMERAS AND FILMS

FIELD OF THE INVENTION

This invention relates to cameras designed for single or limited use. It more particularly relates to cameras that are intended for one use, after which they are recycled, subsequent to removal of the film for development and printing or scanning.

PRIOR ART

There are a variety of single-use cameras that have provided amateur photographers with a simple and low cost means of taking satisfactory pictures. Such cameras have been provided with panoramic lenses of telephoto or portrait lenses, as well as normal lenses. Further, they have been provided with waterproof casings for underwater use.

U.S. Pat. No. 4,758,852 (Maejima) discloses a single-use camera therein referred to as a photographic film package that includes a film that has an MTF value of about 1.1 for a spatial frequency in the range of 5 to 10 lines per millimeter and a taking lens that has an MTF value of between 0.47 and 0.73 for a spatial frequency of 20 lines per millimeter. The photographic sensitivity of the samples described in this publication were however inadequate from the point of view of allowing both short shutter times and high f-stop lens apertures so as to provide sharp pictures from a hand-held camera while still providing pictures under available light conditions.

PROBLEM TO BE SOLVED BY THE INVENTION

While prior single-use cameras were satisfactory for many uses, there remain problems with their use. Such single-use cameras require a sensitive film and a short shutter time to reduce sharpness losses caused by motion of the camera during picture taking. However, high speed (high sensitivity) films tend to be low in sharpness and therefore their use in such cameras leads to pictures that are inadequate for many purposes. Also, there is a need for single-use cameras that will provide negatives that are suitable for production of large prints. However, since high speed, low sharpness films were utilized in single-use cameras, it was difficult to provide large prints utilizing the negatives from these cameras without having a lack of sharpness in the prints. Further, there is a desire in single-use cameras to provide more prints from each camera. One way to do this would be to provide a smaller negative, thereby allowing the same amount of film to take more prints. However, since the negatives were not satisfactory for high magnification enlargements, it was not possible to minimize the size of the negatives exposed without having a deterioration in the sharpness of the prints formed from the negative. Further, there would be fewer ecological concerns if more negatives could be taken on the same amount of film as there would be less generation of chemicals during development per print as well as more negatives taken per single-use camera.

SUMMARY OF THE INVENTION

It is an object of the invention to overcome disadvantages of prior single-use cameras.

It is another object of the invention to provide a film for single-use cameras that provides superior negatives when exposed through a lens having a green light MTF value of less than about 0.8 at a spatial frequency of 20 lines per millimeter.

These and other advantages of the invention are generally accomplished by providing a camera comprising:

a film container;

a color negative film contained in said film container which has a green density MTF value of above 1.25 for a spatial frequency in the range of 15 to 25 lines per mm after imagewise exposure and processing;

a taking lens mounted on said film container to expose said film, said taking lens having a green light MTF value of less than about 0.8 at a spatial frequency of 20 lines per mm;

said color negative film comprising a red light sensitive color record, a green light sensitive color record and a blue light sensitive color record, and having a photographic sensitivity of greater than ISO 100.

ADVANTAGEOUS EFFECTS OF THE INVENTION

The invention has numerous advantages over prior single-use cameras. The camera of the invention will provide prints that are sharp, particularly when greatly enlarged. In the alternative, it is also possible to utilize the camera to expose smaller negative portions that may be enlarged to the typical snapshot size with equal or better sharpness than of an ordinary 35mm enlargement. Further, the film utilized in the camera of the instant invention has both high sensitivity and wide latitude, thereby allowing the formation of satisfactory negatives with a wide variety of exposure conditions thereby providing greater utility to the single-use camera than has heretofore been possible. It is surprising that a single-use camera having a lens of substantially the same quality as prior single-use cameras can be utilized to provide much sharper negatives without compromise of the useful range of ambient light levels of robutsness to camera shake and, consequently, much sharper prints produced from these negatives.

DETAILED DESCRIPTION OF THE INVENTION

The single-use cameras employed in this invention can be any of those known in the art. These cameras can provide specific features as known in the art such as shutter means, film advance means, waterproof housings, single or multiple lenses, lens selection means, variable aperture, focus or focal length lenses, means for monitoring lighting conditions, means for altering shutter times or lens characteristics based on lighting conditions or user provided instructions, and means for recording use conditions directly on the film.

These features include but are not limited to: providing simplified mechanisms for manually or automatically advancing film and resetting shutters as described at Skarman, U.S. Pat. No. 4,226,517; providing apparatus for automatic exposure control as described at Matterson et al, U.S. Pat. No. 4,345,835; moisture-proofing as described at Fujimura et al, U.S. Pat. No. 4,766,451; providing internal and external film casings as described at Ohmura et al, U.S. Pat. No. 4,751,536; providing means for recording use conditions on the film as described at Taniguchi et al, U.S. Pat. No. 4,780,735; providing lens fitted cameras as described at Arai, U.S. Pat. No. 4,804,987; providing film supports with superior anti-curl properties as described at Sasaki et al, U.S. Pat. No. 4,827,298; providing a viewfinder as described at Ohmura et al, U.S. Pat. No. 4,812,863; providing a lens of defined focal length and lens speed as described at Ushiro et al, U.S. Pat. No. 4,812,866; providing multiple film containers as described at Nakayama et al, U.S. Pat. No. 4,831,398 and at Ohmura et al, U.S. Pat. No. 4,833,495; providing films with improved anti-friction characteristics as described at Shiba, U.S. Pat. No. 4,866,469; providing winding mechanisms, rotating spools or resilient sleeves as described at Mochida, U.S. Pat. No. 4,884,087; providing a film patrone (container) removable in an axial direction as described by Takei et al at U.S. Pat. Nos. 4,890,130 and 5,063,400; providing an electronic flash means as described at Ohmura et al, U.S. Pat. No. 4,896,178; providing an externally operable member for effecting exposure as described at Mochida et al, U.S. Pat. No. 4,954,857; providing film support with modified sprocket holes and means for advancing said film as described at Murakami, U.S. Pat. No. 5,049,908; providing internal mirrors as described at Hara, U.S. Pat. No. 5,084,719; and providing silver halide emulsions suitable for use on tightly would spools as described at Yagi et al, European Patent Application 0,466,417 A. The disclosures of these publications are incorporated by reference.

A taking lens mounted on the single-use cameras of the invention are generally single aspherical plastic lenses having a focal length between about 10 and 100 mm, and apertures between f/2 and f/32. The focal length is preferably between about 15 and 60 mm and most preferably between about 20 and 40 mm. Apertures of between f/4 and f/16 are preferred with an aperture of about f/8 to f/12 being more preferred. This combination of focal length and aperture provides for good field of view with simultaneous compact camera design. The lens MTF can be as low as 0.6 or less at a spatial frequency of 20 lines per millimeter (lpm), although values as high as 0.7 or most preferably 0.8 are contemplated. Multiple lens arrangements comprising two, three or more component lens elements consistent with the functions described above are specifically contemplated.

The shutter means employed with the camera allows an exposure time of less than about 1/100 second so as to minimize sharpness losses due to shake inherent with hand held cameras. Shutter times of 1/125 sec to about 1/500 sec are preferred because this provides a good balance of reduced camera motion and mechanically reproducible exposure times.

The camera provides means for exposing more than one scene per unit of film, with arrangements enabling the exposure of 6, 10, 12, 24, 27, 36 or even more distinct scenes being especially preferred.

The camera enables exposure of any desired image areas on the film. Typical are areas of less than about 10 $cm^2$. Even smaller exposure areas can be employed with values of less than 9, 8, or 7 $cm^2$ being preferred. Exposure areas of about 5 $cm^2$ or less are considered as suitable for negative film intended for use to produce snapshot size prints. Exposure areas between about 5 $cm^2$ and 0.5 $cm^2$ are particularly contemplated.

The photographic sensitivity or speed of color negative photographic elements is inversely related to the exposure required to enable the attainment of a specified density above fog after processing. Photographic speed for color negative films with a gamma of about 0.65 has been specifically defined by the American National Standards Institute (ANSI) as ANSI Standard Number PH 2.27-1979 (ASA speed) and relates to the exposure levels required to enable a density of 0.15 above fog in the green light sensitive and least light sensitive color records of a multicolor negative film. This exposure level defines the speed point of the photographic element. This definition conforms to the International Standards Organization (ISO) film speed rating. Larger values of ISO or ANSI film speed indicate a more sensitive photographic element. To be useful in this invention, the photographic element or film must have an ISO speed of greater than about ISO 100. Speeds between 100 and about 1000 are suitable for the film in the single-use camera of the invention. It is contemplated that the element exhibit an ISO speed such as ISO 125, ISO 160, or more preferred ISO 200, and most preferred is ISO 400, or ISO 800.

Film latitude relates to the range of exposures that can be successfully recorded by a photographic element. For the purposes of this invention, useful latitude can be quantified by determining the exposure range which provides a straight line relationship between exposure and density after a white light exposure and processing with less than a 30% drop from straight line in either an underexposed (toe) or overexposed (shoulder) regime in a green or red color record. In order to provide a range a recordable exposures, film latitude in excess of 1.5 log E is typical, film latitude greater than 1.8 log E is suitable and film latitude greater than about 2.1 log E and up to about 4 log E is preferred for the single-use camera of the invention because this provides a wide variety of useful exposure conditions.

Film sample MTF are determined by white light exposure to a sinusoidal patterns of varying spatial frequency followed by photographic processing and analysis of the resultant density patterns. Specific details of this exposure and its evaluation can be found in R. L. Lamberts and F. C. Eisen, "A System for the Automated Evaluation of Modulation Transfer Functions of Photographic Materials", in the Journal of Applied Photographic Engineering, Vol. 6, pages 1–8, February 1980. MTF exposures were generally carried out at about 0.8 to 1.1 log E greater exposure than the speed point as defined above. This placed the MTF exposure at about mid-scale in a density vs. log exposure sense. The exposed samples were then processed using a color negative process, the KODAK C-41 process, for example as described in the British Journal of Photography Annual of 1988 in pages 196–198 (KODAK is a trademark of the Eastman Kodak Company, U.S.A.). To be useful in this invention the film samples should have at least one green density MTF value of above about 1.25 at a spatial frequency in the range of 15 to 25 lpm. It is desirable that all MTF values be above 1.25 in this range. MTF values above about 1.30 at 15 to 25 lpm are preferred because they lead to even sharper prints Consistent MTF values above 1.2 for spatial frequencies of about 10 to 25 lpm are also especially useful as are consistent MTF values of above 1.15 for spatial frequencies of about 10 to 30 lpm because they provide prints of adequate sharpness over a wider range of enlargement conditions.

The photographic elements or films of the camera of this invention are multicolor color negative films. Multicolor elements typically contain dye image-forming color records sensitive to each of the three primary regions of the spectrum. As used herein, the terms "record" and "color record" refer to one or more silver halide containing layers sensitive to the same region of the electromagnetic spectrum. In some cases the multicolor elements may contain records sensitive to other regions of the spectrum or to more than three regions of the spectrum. Each record can be comprised of a single emulsion layer or of multiple emulsion layers sensitive to a given region of the spectrum. The layers of the element, including the layers of the image-forming records, can be arranged in various orders as known in the art.

A typical multicolor photographic element comprises a support bearing a cyan dye image-forming record comprising at least one red-sensitive silver halide emulsion layer having associated therewith at least one cyan dye-forming coupler, a magenta image forming record comprising at least one green-sensitive silver halide emulsion layer having at least one magenta dye-forming coupler and a yellow dye image-forming record comprising at least one blue-sensitive silver halide emulsion layer having associated therewith at least one yellow dye-forming coupler. As used herein, blue light means light of about 400 to 500 nm wavelength, green flight means light of about 500 to 600 nm wavelength, and red light means light of about 600 to 700 nm wavelength. In some instances it may be advantageous to employ other pairings of silver halide emulsion sensitivity and dye image-forming couplers, as in the pairing of an infra-red sensitized silver halide emulsion with a magenta dye-forming coupler or in the pairing of a blue-green sensitized emulsion with a coupler enabling minus-cyan dye formation. The material can contain additional layers, such as filter layers, interlayers, overcoat layers, subbing layers, and the like. The layers of the material above the support typically have a total thickness of between about 5 and 30 microns. The total silver content of the material is typically between 1 and 10 grams per $m^2$.

It is generally preferred to minimize the thickness of the element above the support so as to improve sharpness and improve access of processing solutions to the components of the element. For this reason, thicknesses of less than 25 microns are preferred and thicknesses of less than 20 microns are even more preferred. These lowered thicknesses can be especially enabled at manufacture by use of surfactants, polymers, and other coatings aids as known in the art so as to control surface tension and viscosity. Other polymeric materials, humectants, and gelatin plasticizers are known to improve hardening leading to better physical integrity and reduced sensitometric variability over time. Both sharpness and ease of processing may be further improved by minimizing the quantity of incorporated silver in the element. Total silver of less than about 7 grams per square meter is preferred and total silver of less than about 5 grams per square meter is even more preferred. Sharpness in color images is further improved by complete removal of silver and silver halide from the element on processing. Since more swellable elements enable better access of components of processing solutions to the elements of this invention, swell ratios above 1.25 are preferred, with swell ratios of between 1.4 and 6 being more preferred and swell ratios of between 1.7 and 3 being most preferred. The balance of total thickness, total silver and swell ratio most suitable for an element intended for a specific purpose can be readily derived from the image structure, color reproduction, sensitivity and physical integrity and photographic resistance to pressure required for that purpose as known in the art. Use of polymeric materials and gelatin levels as known in the art to further control these photographic and physical properties is recommended.

In the following discussion of suitable compounds for use in the elements of this invention, reference will be made to *Research Disclosure,* December 1989, Item 308119, published by Kenneth Mason Publications, Ltd., The Old Harbourmaster's 8 North Street, Emsworth, Hampshire P010 7DD, ENGLAND, the disclosure of which are incorporated herein by reference. This publication will be identified hereafter by the tern "Research Disclosure".

The silver halide emulsions employed in the element of this invention can be comprised of silver bromide, silver chloride, silver iodide, silver chlorobromide, silver chloroiodide, silver bromoiodide, silver chlorobromoiodide or mixtures thereof. The emulsions can include silver halide grains of any conventional shape or size. Specifically, the emulsions can include coarse, medium or fine silver halide grains.

The sensitized tabular grain silver halide emulsions useful in this invention include those disclosed by Kofron et alia in U.S. Pat. No. 4,439,520 and in the additional references cited below. These tabular grain silver halide emulsions and other emulsions useful in the practice of this invention can be characterized by geometric relationships, specifically the Aspect Ratio and the Tabularity. The Aspect Ratio (AR) and the Tabularity (T) are defined by the following equations:

$$AR = \frac{\text{Equivalent Circular Diameter}}{\text{Thickness}}$$

$$T = \frac{\text{Equivalent Circular Diameter}}{\text{Thickness} \times \text{Thickness}}$$

where the equivalent circular diameter and the thickness of the grains, measured using methods commonly known in the art, are expressed in units of microns.

Tabular Grain Emulsions useful in this invention have an AR greater than 2, can have an aspect ratio greater than 5, and are preferred to have an AR> 10. These useful emulsions additionally can be characterized in that their Tabularity is generally greater than 25 and they have a preferred Tabularity of greater than 50 for best sharpness while having good speed.

Tabular grain emulsions are specifically contemplated, such as those disclosed by Wilgus et al U.S. Pat. No. 4,434,226, Daubendiek et al U.S. Pat. No. 4,414,310, Wey U.S. Pat. No. 4,399,215, Solberg et al U.S. Pat. No. 4,433,048, Mignot U.S. Pat. No. 4,386,156, Evans et al U.S. Pat. No. 4,504,570, Maskasky U.S. Pat. No. 4,400,463, Wey et al U.S. Pat. No. 4,414,306, Maskasky U.S. Pat. Nos. 4,435,501 and 4,643,966, and Daubendiek et al U.S. Pat. Nos. 4,672,027 and 4,693,964. Also specifically contemplated are those silver bromoiodide grains with a higher molar proportion of iodide in the core of the grain than in the periphery of the grain, such as those described in G. B. Patent 1,027,146; Japanese 54/48521; U.S. Pat. No. 4,379,837; U.S. Pat. No. 4,444,877; U.S. Pat. No. 4,665,012; U.S. Pat. No. 4,686,178; U.S. Pat. No. 4,565,778; U.S. Pat. No. 4,728,602; U.S. Pat. No. 4,668,614; U.S. Pat. No. 4,636,461; EP 264,954; and U.S. Ser. No. 842,683 of Antoniades et al filed Feb. 27, 1992. Also suitable for the invention are tabular silver chloride grains such as disclosed in U.S. Pat. Nos. 5,176,991; 5,176,992; 5,178,998; 5,183,732; and 5,185,239 and European Patent Publication 0 534 395. The silver halide emulsions can be either monodisperse or polydisperse as precipitated. The grain size distribution of the emulsions can be controlled by silver halide grain separation techniques or by blending silver halide emulsions of differing grain sizes.

Sensitizing compounds, such as compounds of copper, thallium, lead, bismuth, cadmium and Group VIII noble metals, can be present during precipitation of the silver halide emulsion.

The emulsions can be surface-sensitive emulsions, i.e., emulsions that form latent images primarily on the surfaces of the silver halide grains, or internal latent image-forming emulsions, i.e., emulsions that form latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent.

The silver halide emulsions can be surface sensitized. Noble metal (e.g., gold), middle chalcogen (e.g., sulfur, selenium, or tellurium), and reduction sensitizers, employed individually or in combination, are specifically contemplated. Typical chemical sensitizers are listed in *Research Disclosure,* Item 308119, cited above, Section III.

The silver halide emulsions can be spectrally sensitized with dyes from a variety of classes, including the polymethine dye class, which includes the cyanines, merocyanines, complex cyanines, and merocyanines (i.e., tri-, tetra-, and poly-nuclear cyanines and merocyanines), oxonols, hemioxonols, styryls, merostyryls, and streptocyanines. Illustrative spectral sensitizing dyes are disclosed in *Research Disclosure,* Item 308119, cited above, Section IV.

The spatially fixed dyes useful in this invention are well known in the art. These spatially fixed dyes are also known as non-diffusible dyes and as anti-halation dyes. Typical examples of spatially fixed dyes, their preparation and methods of incorporation in photographic materials are disclosed in U.S. Pat. Nos. 4,855,220; 4,756,600; and 4,956,269, as well as by commercially available materials. Other examples of spatially fixed dye are disclosed at Section VIII of Research Disclosure.

The dye absorbs light in the region of the spectrum to which the silver halide layer is sensitized. While the dye will generally absorb light primarily only in that region, dyes that absorb light in other regions of the spectrum, as well as the region to which the silver halide is sensitized, are also included.

By spatially fixed, it is meant that little or none of the dye will migrate out of the layer in which it has been incorporated before the photographic material has been processed.

These dyes may be ballasted to render them non-diffusible or they may be intrinsically diffusible but rendered non-diffusible by use of organic mordanting materials, such as charged or uncharged polymeric matrixes, or rendered non-diffusible by adhesion to inorganic solids such as silver halide, or organic solids all as known in the art. Alternatively, these dyes may be incorporated in polymeric latexes. These dyes may additionally be covalently bound to polymeric materials.

These dyes may retain their color after processing or may change in color, be decolorized or partially or completely removed from the photographic material during processing. For ease of direct viewing or optical printing it may be preferred that the dyes be removed from the material or be rendered non-absorbing in the visible region during or after processing. During photographic development (generally in high pH, e.g. 9 or above, sulfite containing processing solution), bleaching (in iron containing or persulfate or other peroxy containing solutions at lower pH, e.g. 7 or below) or fixing, the dye may be decolorized or removed from the material. In photographic elements where the image may be electronically scanned or digitally manipulated, the element may or may not retain some degree of coloration depending on the intended use.

The spatially fixed dye may be a diffusible acidic dye that is rendered non-diffusible by incorporating a base group-containing polymeric mordant for the dye at a specified position in the photographic material. Such dyes preferably have a sulfo- or carboxy-group. Useful dyes can be acidic dyes of the azo type, the triphenylmethane type, the anthroquinone type, the styryl type, the oxanol type, the arylidene type, the merocyanine type, and others known in the art. Polymer mordants are well known in the art and are described, for example, in U.S. Pat. Nos. 2,548,564; 2,675,316; 2,882,156; and 3,706,563 as well as in *Research Disclosure,* Item 308119, Section VIII.

The spatially fixed dye may also be a solid particle dispersion of a loaded polymer latex of a dye that is insoluble at coating pH but soluble at processing pH's as described in U.S. Pat. No. 4,855,211—Factor et al.

Additionally, the dye may be a colored image dye-forming coupler as disclosed in *Research Disclosure.* Item 308119, Section VII. The color of such a dye may be changed during processing. The dye may be a pre-formed image coupler dye which would generally remain in the material during processing. The dye may also be a spectral sensitizing dye immobilized by adsorption to chemically unsensitized silver halide. Such a dye would generally be removed removed from the material during the bleaching or fixing step.

It is preferred that such spatially fixed dyes be positioned closer to the image exposure source than the photographic layer comprising a silver halide emuslion sensitized to a region of the spectrum where such dyes absorb light.

Examples of useful spatially fixed dyes include the dye materials described in the photographic examples illustrating the practice of this invention, in the disclosures cited earlier and include the structures shown below.

CM-1
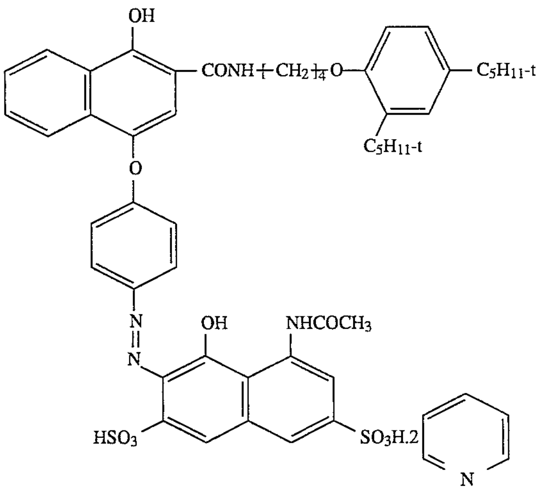
MM-1
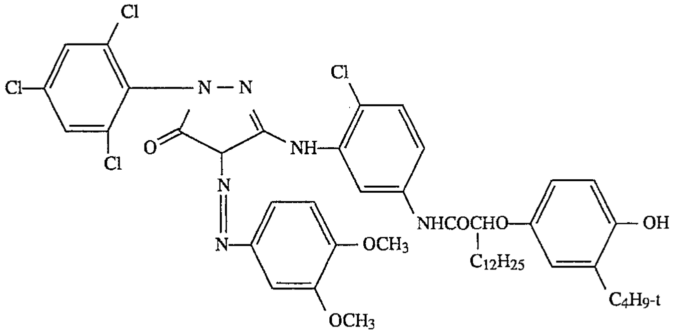
MM-2
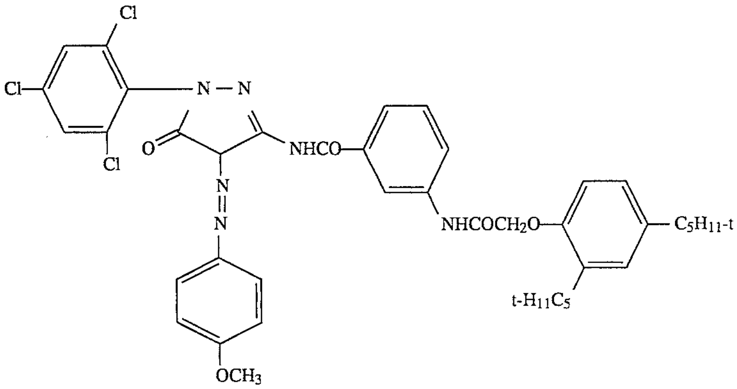

-continued
CD-1
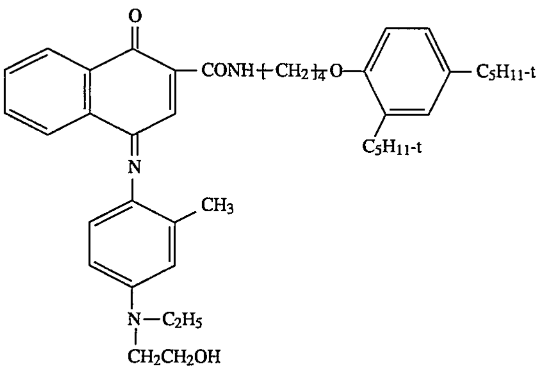
MD-1
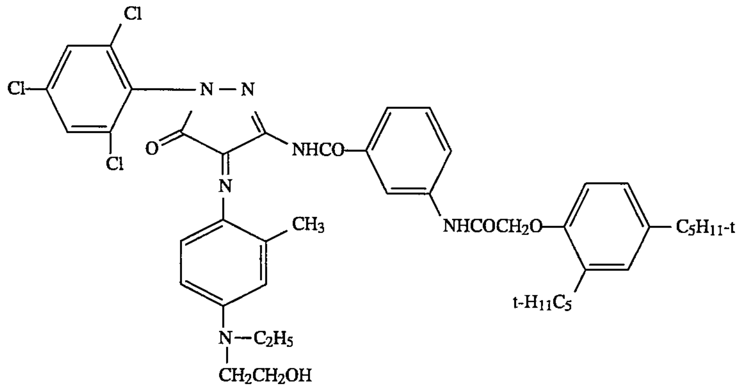
YD-1
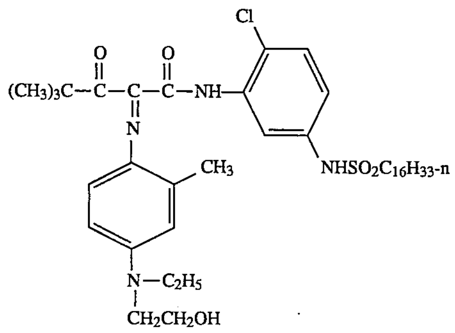
YD-2
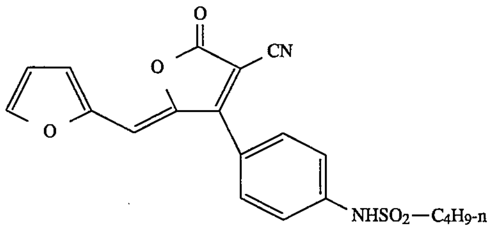
SOL-M1
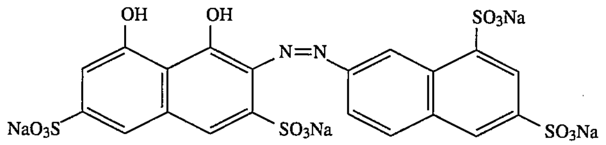
SOL-C1

-continued
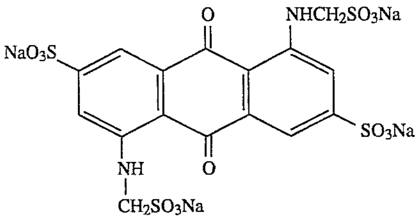
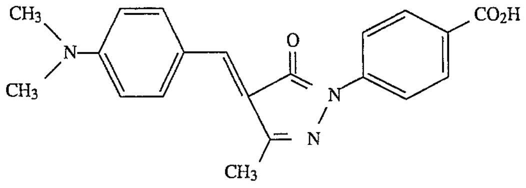
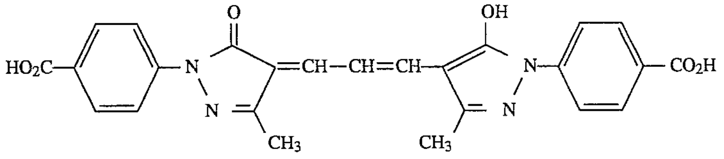
CD-3
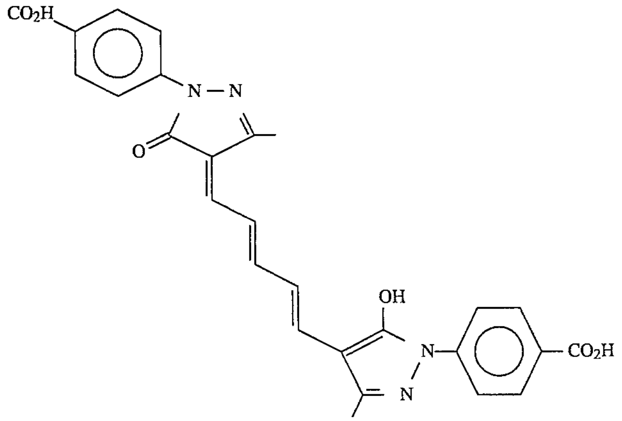
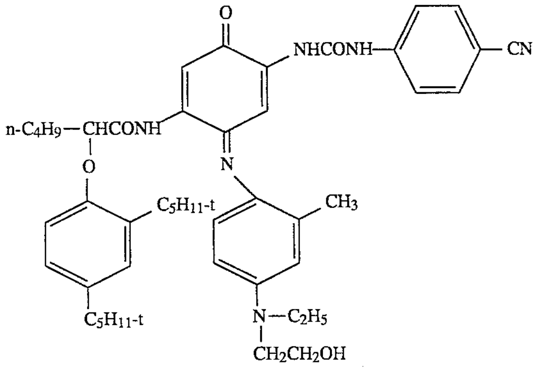
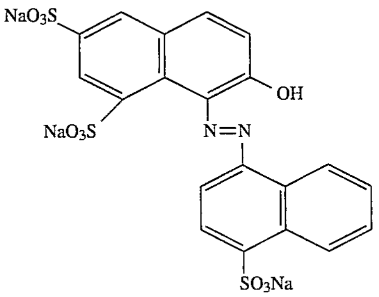
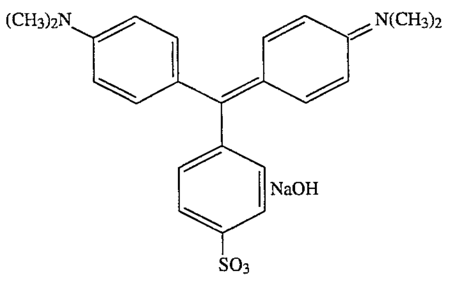
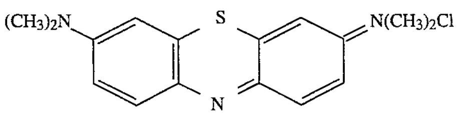
SOL-Y1

-continued

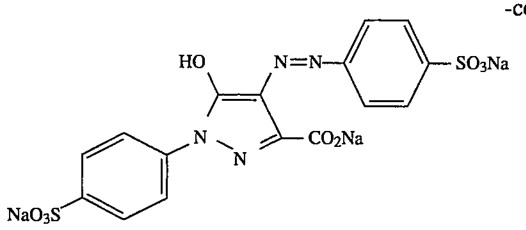

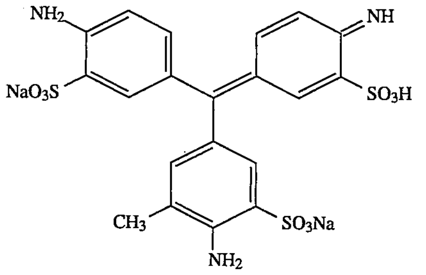

Other useful dye structures include but are not limited to

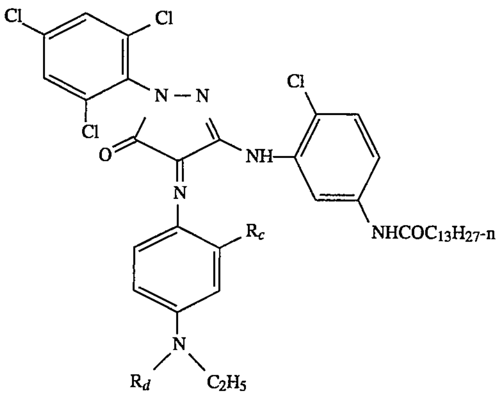

where $R_c$=—H or —$CH_3$
and $R_d$=—H; —$CH_2CH_2OH$; —$CH_2CH_3$; or —$CH_2CH_2$—$NHSO_2CH_3$.

Examples of polymer mordants useful in combination with diffusible acidic dyes in elements of the present invention include the following:

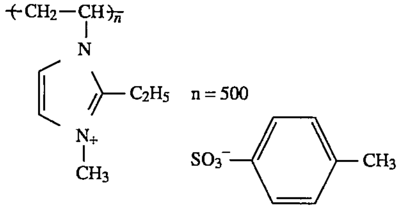

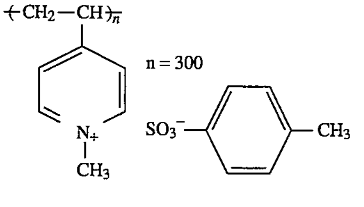

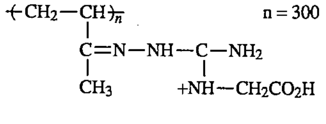

-continued

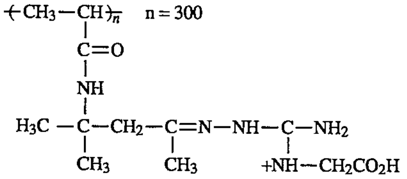

Alternatively, it may be desirable to employ anionically charged polymers in combination with diffusible cationic dyes. The quantity of spatially fixed dye to be employed is chosen so as to maximize the sharpness gain while minimizing the sensitivity loss. Sensitivity losses of up to 1%, 5%, 20%, 25%, 40%, 50% or more are specifically contemplated.

The distributed dyes of this invention may suitably be any of the soluble dyes known in the art as disclosed commercially, in U.S. Pat. Nos. 4,855,220; 4,756,600; and 4,956,269, or at Section VIII of *Research Disclosure* cited earlier.

By distributed, it is meant that quantities of the dye (or a dye combination) which absorbs light in the same region of the spectrum as which the silver halide layer is sensitized, are present in several of the layers of the photographic material before the exposure of said material.

It is preferred that such distributed dyes be positioned both closer to, coincident with and further from the image exposure source than the photographic layer comprising silver halide emuslion sensitized to a region of the spectrum where such dyes absorb light.

The preferred soluble dyes generally are diffusible and have the property of distributing within the structure of a photographic material to a greater or lesser extent during a wet coating procedure or during a subsequent curing or storage procedure. Alternatively, these dyes may be added to a photographic element in a subsequent coating, imbibing or like procedure as known in the art. These soluble dyes may additionally be caused to distribute in specific patterns within a photographic element by the addition of mordanting materials in appropriate quantities and positions within the structure of the photographic element. The mordanting material may be the charged or uncharged polymeric materials described earlier. Alternatively, the distribution of the dye may be controlled by the quantity and disposition of hydrophobic organic materials such as couplers or coupler solvents or absorbent charged or uncharged inorganic materials such as silver halide and the like within the coating structure.

Alternatively, but less preferredn non-diffusible dyes may be employed and evenly distributed in the photographic element. These may include any of the non-diffusible dyes previously described. When non-diffusible dyes are employed they may be distributed within a photographic element by addition of a portion of each to the photographic layers as they are coated.

The dye absorbs light in the region of the spectrum to which the silver halide layer is sensitized. While the dye will generally absorb light primarily only in that region, dyes that absorb light in other regions of the spectrum as well as the region to which the silver halide is sensitized are also contemplated.

These dyes may retain their color after processing or may change in color, be decolorized or partially or completely removed from the photographic element during processing. For ease of direct viewing or optical printing it may be preferred that the dyes be removed from the film or rendered non-absorbing in the visible region during or after processing. During photographic development (generally in high pH, e.g., 9 or above, sulfite containing processing solution), bleaching (in iron containing or persulfate or other peroxy containing solutions at lower pH, e.g., 7 or below) or fixing, the dye may be decolorized or removed from the material. In photographic elements where the image may be electronically scanned or digitally manipulated, the element may or may not retain some degree of coloration depending on the intended use.

The distributed dye may be a diffusible acidic dye. Such dyes preferably have a sulfo- or carboxy-group. Useful dyes can be acidic dyes of the azo type, the triphenylmethane type, the anthroquinone type, the styryl type, the oxanol type, the arylidene type, the merocyanine type, and others known in the art.

Specific examples of distributed dyes are shown in the literature cited earlier, in the discussion of spatially fixed dyes and in the examples illustrating the practice of the invention.

The quantity of distributed dye to be employed is chosen so as to maximize the sharpness gain while minimizing the sensitivity loss. Sensitivity losses of up to 1%, 5%, 20%, 25%, 40%, 50%, or more are contemplated. It is specifically contemplated to use both distributed and spatially fixed dyes in combination.

The thicknesses of the silver halide emulsions employed in this invention may be advantageously adjusted for the purposes of improving film performance according to principles described in *Research Disclosure,* May, 1985, Item 25330. This disclosure teaches, by extrapolation from the optical properties of silver bromide sheet crystals, that the thicknesses of silver halide emulsions incorporated in specific photographic layers and sensitized to one spectral region may be chosen to enable either improved speed or improved sharpness behavior in other photographic layers incorporating silver halide emulsions sensitized to different regions of the spectrum. These improvements are said to occur because the light transmission and reflection properties of the silver halide emulsions are controlled in large part by their grain thicknesses. Further discussion on the relationship between the thickness of silver halide crystals and their reflectance properties can be found in Optics, by J. M. Klein, John Wiley & Sons, New York, 1960, pages 582 to 585.

It is also known that the sharpness of a photographic record can be improved by setting the thickness of the sensitized tabular grain emulsion utilized in a layer of that record such that light reflection in the region of the spectrum to which that emulsion is sensitized is at a minimum.

Thus, to improve sharpness in a blue sensitized record which incorporates a blue sensitized emulsion with a peak sensitivity at about 450 nm used in a blue sensitive layer, an emulsion grain thickness of between 0.08 and 0.10 microns is preferred. An emulsion grain thickness close to the center of this range, i.e. 0.09 microns is more preferred. An emulsion grain thickness of between 0.19 and 0.21 microns can also be used to advantage in this instance.

In a like manner, to improve sharpness in a green sensitized record which incorporates a green sensitized emulsion with a peak sensitivity at about 550 nm used in a most green sensitive layer, an emulsion grain thickness of between 0.11 and 0.13 microns is preferred. An emulsion grain thickness close to the center of this range, i.e. 0.12 microns is more preferred. An emulsion grain thickness of between 0.23 and 0.25 microns can also be used to advantage in this instance.

In a similar vein, to improve sharpness in a red sensitized record which incorporates a red sensitized emulsion with a peak sensitivity at about 650 nm used in a most red sensitive layer, an emulsion grain thickness of between 0.14 and 0.17 microns is preferred. An emulsion grain thickness close to the center of this range, i.e. 0.15 microns is more preferred. An emulsion grain thickness of between 0.28 and 0.30 microns can also be used to advantage in this instance.

It is straightfoward to choose emulsion grain thicknesses to improve the sharpness behavior of emulsions sensitized to other regions of the spectrum or with peak sensitivity at different wavelenghts according to this invention by following the disclosed pattern.

Thus, for an infrared sensitized emulsion with peak sensitivity at 750 nm, an emulsion grain thickness of between 0.17 and 0.19 microns would be chosen, while for a blue-green sensitized emulsion with peak sensitivity at 500 nm, an emulsion grain thickness of between 0.10 and 0.12 microns would be chosen.

When a photographic record is comprised of more than one photographic layer, it is additionally preferred that the thickness of the silver halide emulsions used in a less sensitive layer be chosen so as to minimize reflection in the region of the spectrum to which the emulsion is sensitized.

Even when the thickness of a silver halide emulsion employed in a less sensitive layer is not chosen according to this pattern, it may be useful to choose the thickness of an emulsion used in a still less sensitive layer according to the disclosed pattern.

The photographic elements of this invention may advantageously comprise Development Inhibitor Releasing Compounds, also called DIR compounds as known in the art. Typical examples of DIR compounds, their preparation and methods of incorporation in photographic elements are disclosed in U.S. Pat. Nos. 4,855,220 and 4,756,600, as well as by commercially available materials. Other examples of useful DIR compounds are disclosed at Section VIIF of *Research Disclosure.*

These DIR compounds may be incorporated in the same layer as the emulsions of this invention, in reactive association with this layer or in a different layer of the photographic element, all as known in the art.

These DIR compounds may be among those classified as "diffusible," meaning that they enable release of a highly transportable inhibitor moiety or they may be classified as "non-diffusible" meaning that they enable release of a less transportable inhibitor moiety.

The inhibitor moiety of the DIR compound may be unchanged as the result of exposure to photographic processing solution. However, the inhibitor moiety may change in structure and effect in the manner disclosed in U. K. Patent No. 2,099,167; European Patent Application 167,168; Japanese Kokai 205150/83 or U.S. Pat. No. 4,782,012 as the result of photographic processing.

The development inhibitor can be attached to any moiety from which it can be released during the development step. Typically, the compound contains a carrier group from which the inhibitor is released either directly or from an intervening timing or linking group which is first released from the carrier group.

Carrier groups useful in DIR compounds include various known groups from which the development inhibitor can be released by a variety of mechanism. Representative carrier groups are described, for example, in U.S. Pat. No. 3,227,550 and Canadian Patent 602,607 (release by chromogentic coupling); U.S. Pat. No. 3,443,939 and 3,443,940 (release by intramolecular ring closure); U.S. Pat. Nos. 3,628,952; 3,698,987; 3,725,062; 3,728,113; 3,844,785; 4,053,312; 4,055,428 and 4,076,529 (release after oxidation of carrier); U.S. Pat. Nos. 3,980,479 and 4,199,335; and U.K. Patents 1,464,104 and 1,464,105 (release unless carrier is oxidized); and U.S. Pat. No. 4,139,379 (release after reduction of carrier).

The timing or linking group of the DIR compound can be any organic linking group which will serve to join the development inhibitor moiety to the carrier moiety and which, after its release from the carrier, will be cleaved from the development inhibitor moiety. Such groups are described, e.g., in U.S. Pat. Nos. 4,248,962; 4,409,323; and 4,861,701.

When the DIR compound is a developing agent of the type disclosed, for example, at U.S. Pat. No. 3,379,529, the development inhibitor is imagewise released as a result of silver halide development by the developing agent, optionally in the presence of an auxiliary developing agent.

When the DIR compound is a hydroquinone compound of the type described, for example, in European Patent Application 0,167,168, the development inhibitor is imagewise released by a redox reaction in the presence of an oxidized developing agent.

When the DIR compound is a coupler, the development inhibitor group is imagewise released by a coupling reaction between the coupler and oxidized color developing agent. The carrier moiety can be any coupler moiety employed in conventional color photographic couplers which yields either colored or a colorless reaction product. Especially preferred are coupler compounds, including both dye forming couplers and so called "universal" couplers which do not form a permanent colored species on reaction with oxidized silver halide developing agent.

For a DIR compound to be in reactive association with a light sensitive layer means that development in that layer causes the DIR compound to release a development inhibitor or precursor thereof.

The DIR compounds can be employed in any quantity known in the art. Typically, quantities of greater than about 0.001 mole percent relative to sensitized silver halide are employed. It is preferred to employ between about 0.01 and 10 mole percent, more preferred to employ quantities between 0.05 and 5 mole percent and most preferred to employ between about 0.1 and 2 mole percent relative to sensitized silver halide.

When the DIR compounds are dye-forming couplers, they may be incorporated in reactive association with complementary color sensitized silver halide emulsions, as for example a cyan dye-forming DIR coupler with a red sensitized emuslion or in a mixed mode, as for example a yellow dye-forming DIR coupler with a green sensitized emulsion, all as known in the art.

The DIR compounds may also be incorporated in reactive association with bleach accelerator releasing couplers as disclosed in U.S. Pat. Nos. 4,912,024 and 5,135,839, and in U.S. application Ser. No. 563,725 filed Aug. 8, 1990.

Specific DIR compounds useful in the practice of this invention are disclosed in the above cited references, in commercial use and in the examples demonstrating the practice of this invention which follow. The structures of other useful DIR compounds are shown below.

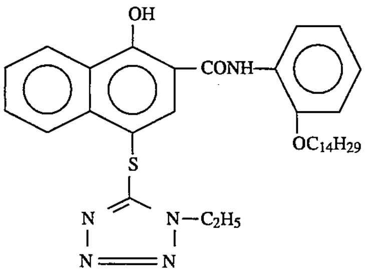

D-1

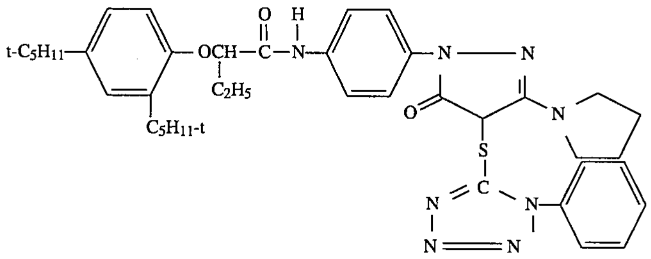

D-2

-continued
D-3
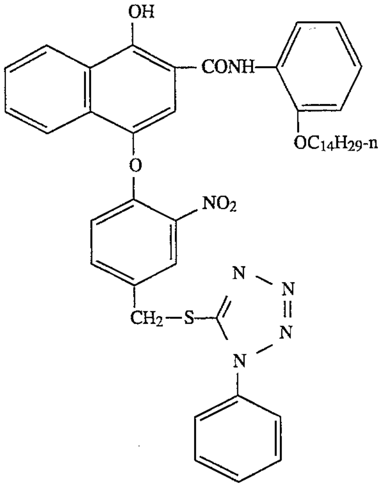
D-4
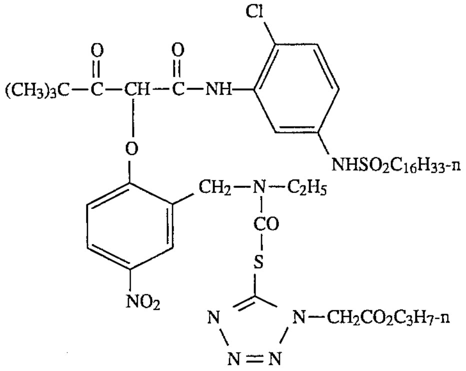
D-5
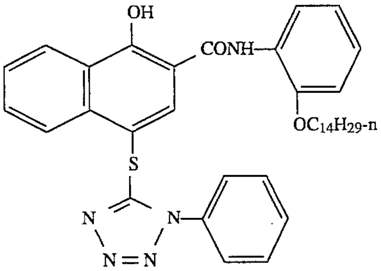
D-6
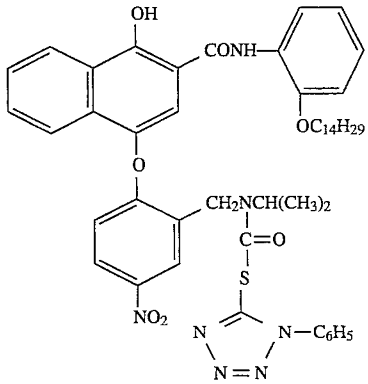
D-7
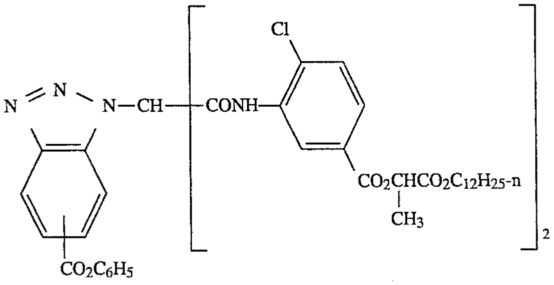
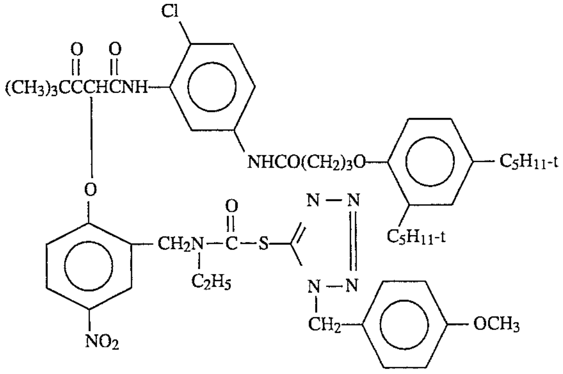

-continued
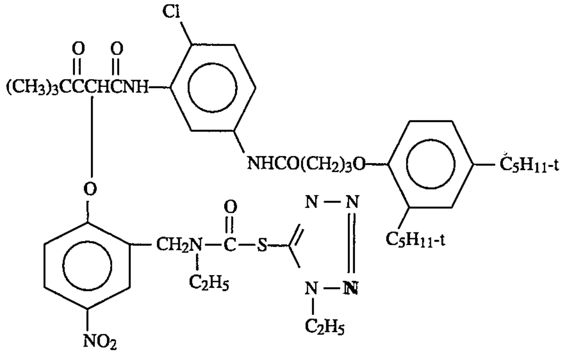
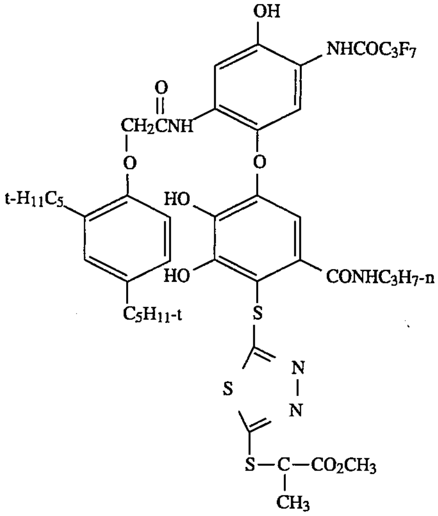
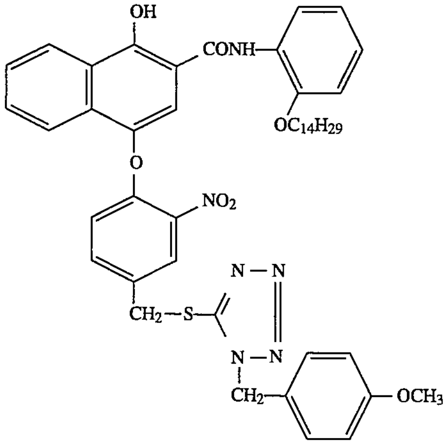
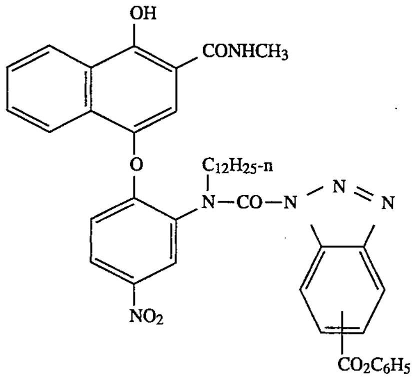
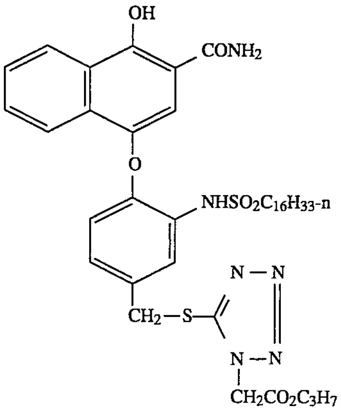

-continued

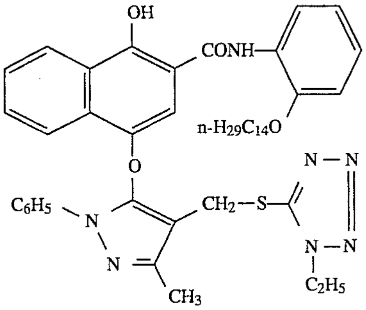

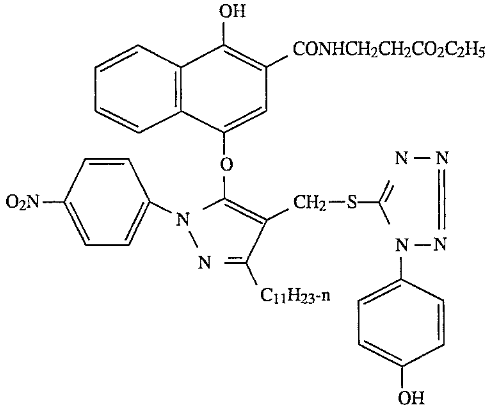

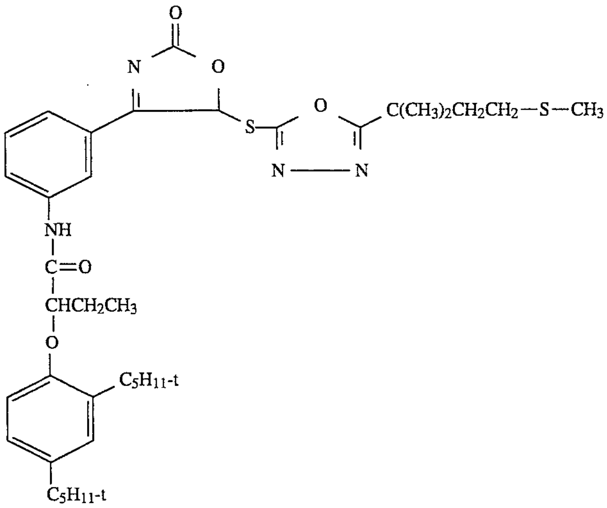

Suitable vehicles for the emulsion layers and other layers of photographic materials of this invention are described in *Research Disclosure* Item 308119, Section IX, and the publications cited therein.

In addition to the couplers described herein, the materials of this invention can include additional couplers as described in *Research Disclosure* Section VII, paragraphs D, E, F, and G, and the publications cited therein. These additional couplers can be incorporated as described in *Research Disclosure* Section VII, paragraph C, and the publications cited therein.

The photographic materials of the invention may also comprise Bleach Accelerator Releasing (BAR) compounds as described in European Patents 0 193 389 B and 0 310 125; and at U.S. Pat. No. 4,842,994, and Bleach Accelerator Releasing Silver Salts as described at U.S. Pat. Nos. 4,865,956 and 4,923,784 hereby incorporated by reference. Typical structures of such useful compounds include:

B-1

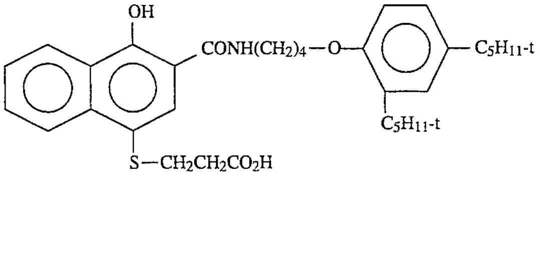

-continued

B-2

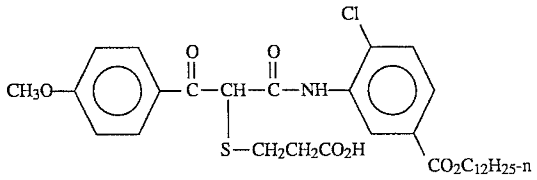

B-3

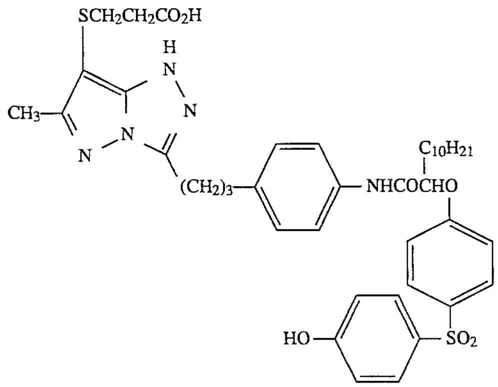

-continued

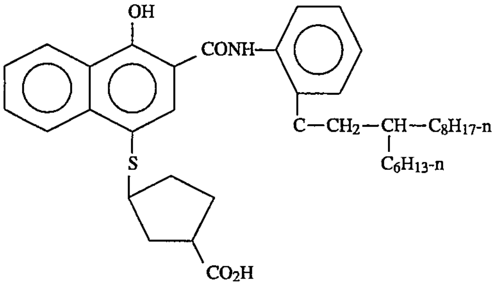

Ag—S—$CH_2CH_2CO_2H$

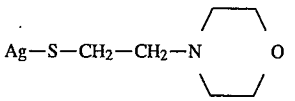

The photographic materials of this invention can be used with colored masking couplers as described in U.S. Pat. Nos. 4,883,746 and 4,833,069.

The photographic materials of this invention can contain brighteners (*Research Disclosure* Section V), antifoggants and stabilizers (*Research Disclosure* Section VI), antistain agents and image dye stabilizers (*Research Disclosure* Section VII, paragraphs I and J), light absorbing and scattering materials (*Research Disclosure* Section VIII), hardeners (*Research Disclosure* Section XI), plasticizers and lubricants (*Research Disclosure* Section XII), antistatic agents (*Research Disclosure* Section XIII), matting agents (*Research Disclosure* Section XVI), and development modifiers (*Research Disclosure* Section XXI).

The photographic materials can comprise polymer latexes as described in U.S. patent application Ser. Nos. 720,359 and 720,360 filed Jun. 25, 1991, and 771,016 filed Oct. 1, 1991, and in U.S. Pat. Nos. 3,576,628; 4,247,627; and 4,245,036, the disclosures of which are incorporated by reference.

The photographic materials can be coated on a variety of supports as described in *Research Disclosure* Section XVII and the references described therein.

Use of a support including a magnetic layer as described in *Research Disclosure* Item No. 34390, November 1992, and at European Patent Application 0 476 327 is specifically contemplated.

Photographic materials can be exposed to actinic radiation, typically in the visible region of the spectrum, to form a latent image as described in *Research Disclosure* Section XVIII and then processed to form a visible dye image as described in *Research Disclosure* Section XIX. Processing to form a visible dye image includes the step of contacting the material with a color developing agent to reduce developable silver halide and oxidize the color developing agent. Oxidized color developing agent in turn reacts with the coupler to yield a dye.

With negative working silver halide this processing step leads to a negative image. To obtain a positive (or reversal) image, this step can be preceded by development with a non-chromogenic developing agent to develop exposed silver halide, but not form dye, and then uniform fogging of the element to render unexposed silver halide developable. Alternatively, a direct positive emulsion can be employed to obtain a positive image.

Development is followed by the conventional steps of bleaching, fixing, or bleach-fixing to remove silver and silver halide, washing, and drying.

Typical bleach baths contain an oxidizing agent to convert elemental silver, formed during the development step, to silver halide. Suitable bleaching agents include ferricyanides, dichromates, ferric complexes of aminocarboxylic acids, such as ethylene diamine tetraacetic acid and 1,3-propylene diamine tetraacetic acid as described at *Research Disclosure,* Item No. 24023 of April, 1984. Also useful are peroxy bleaches such as persulfate, peroxide, perborate, and percarbonate. These bleaches may be most advantageously employed by additionally employing a bleach accelerator releasing compound in the film structure. They may also be advantageously employed by contacting the film structure with a bleach accelerator solution during photographic processing. Useful bleach accelerator releasing compounds and bleach accelerator solutions are discussed in European Patents 0 193 389B and 0 310 125A; and in U.S. Pat. Nos. 4,865,956; 4,923,784; and 4,842,994, the disclosures of which are incorporated by reference.

Fixing baths contain a complexing agent that will solubilize the silver halide in the element and permit its removal from the element. Typical fixing agents include thiosulfates, bisulfites, and ethylenediamine tetraacetic acid. Sodium salts of these fixing agents are especially useful. These and other useful fixing agents are described in U.S. Pat. No. 5,183,727, the disclosures of which are incorporated by reference. Use of a peracid bleach bath and a subsequent low ammonium thiosulfate fixing bath are especially preferred.

In some cases the bleaching and fixing baths are combined in a bleach/fix bath.

The following examples illustrate the practice of this invention. They are not intended to be exhaustive of all possible variations of the invention. Parts and percentages are by weight unless otherwise indicated.

PREPARATIVE PHOTOGRAPHIC EXAMPLE 1

A comparative control color photographic recording material (Photographic Sample 101) for color negative development was prepared by applying the following layers in the given sequence to a transparent support of cellulose acetate. The quantity of silver halide present is reported in grams of silver per square meter.

Compounds M-1, M-2, D-2, D-7, D-9, and MM-1 were used as emulsions containing tricresylphosphate; compounds B-1, C-1, C-2, CD-2, D-3, and Y-1 were used as emulsions comprising di-n-butyl phthalate; compound D-1 was used as an emulsion comprising N-n-butyl acetanilide; compounds UV-1 UV-2, MD-1 and S-1 were used as emulsions comprising 1,4-cyclohexylene dimethylene bis-(2-ethoxyhexanoate).

Layer 1 {Antihalation Layer} black colloidal silver sol containing 0.22 g/m2 of silver, MM-2 at 0.17 g/m2, dye MD-1 at 0.22 g/m2, dye CD-1 at 0.032 g/m2, scavenger S-2 at 0.075 g/m2, with 2.44 g/m2 gelatin.

Layer 2 {Lowest Sensitivity Red-Sensitive Layer} A blend of slower red sensitized tabular silver iodobromide emulsion [1.8 mol % iodide, average grain diameter 0.50 micron, average grain thickness 0.08 micron] at 0.22 g/m2 and faster red sensitized tabular silver iodobromide emulsion [4.1 mol % iodide, average grain diameter 1.0 micron, average grain thickness 0.09 micron] at 0.33 g/m2, cyan dye-forming image coupler C-1 at 0.54 g/m2, bleach accelerator B-1 at 0.009 g/m2, and gelatin at 1.77 g/m2.

Layer 3 {Medium Sensitivity Red-Sensitive Layer} Red sensitized tabular silver iodobromide emulsion [4.1 mol % iodide, average grain diameter 1.3 microns, average grain thickness 0.12 micron] at 0.54 g/m2, cyan dye-forming image coupler C-1 at 0.23 g/m2, DIR compound D-1 at 0.048 g/m2, DIR compound D-5 at 0.003 g/m2, cyan dye-forming masking coupler CM-1 at 0.022 g/m2, bleach accelerator B-1 at 0.003 g/m2, and gelatin at 1.58 g/m2.

Layer 4 {Highest Sensitivity Red-Sensitive Layer} Red sensitized tabular silver iodobromide emulsion [4.1 mol % iodide, average grain diameter 2.8 microns, average grain thickness 0.12 microns] at 1.18 g/m2, cyan dye-forming image coupler C-1 at 0.17 g/m2, DIR compound D-1 at 0.048 g/m2, DIR compound D-5 at 0.003 g/m2, cyan dye-forming masking coupler CM-1 at 0.048 g/m2, bleach accelerator B-1 at 0.002 g/m2, and gelatin at 1.73 g/m2.

Layer 5 {Interlayer} Gelatin at 1.29 g/m2.

Layer 6 {Lowest Sensitivity Green-Sensitive Layer} Green sensitized tabular silver iodobromide emulsion [4.1 mol % iodide, average grain diameter 1.0 microns, average thickness 0.09 microns] at 0.75 g/m2, magenta dye-forming image coupler M-1 at 0.22 g/m2, magenta dye-forming image coupler M-2 at 0.054 g/m2, bleach accelerator B-3 at 0.032 g/m2, and gelatin at 1.29 g/m2.

Layer 7 {Medium Sensitivity Green-Sensitive Layer} Green sensitized tabular silver iodobromide emulsion [4.1 mol % iodide, average grain diameter 1.3 microns, average thickness 0.13 microns] at 0.97 g/m2, magenta dye-forming image coupler M-1 at 0.086 g/m2, magenta dye-forming image coupler M-2 at 0.027 g/m2, DIR compound D-7 at 0.032 g/m2, magenta dye-forming masking coupler MM-1 at 0.086 g/m2, bleach accelerator B-1 at 0.003 g/m2, bleach accelerator B-3 at 0.016 g/m2, and gelatin at 1.51 g/m2.

Layer 8 {Highest Sensitivity Green-Sensitive Layer} Green sensitized tabular silver iodobromide emulsion [4.1 mol % iodide, average grain diameter 2.3 microns, average grain thickness 0.13 microns] at 0.97 g/m2, magenta dye-forming image coupler M-1 at 0.093 g/m2, magenta dye-forming image coupler M-2 at 0.029 g/m2, magenta dye-forming masking coupler MM-1 at 0.043 g/m2, DIR compound D-2 at 0.011 g/m2, DIR compound D-7 at 0.008 g/m2, bleach accelerator B-1 at 0.003 g/m2, and gelatin at 1.89 g/m2.

Layer 9 {Interlayer} Yellow filter dye YD-2 at 0.11 g/m2, and gelatin at 1.29 g/m2.

Layer 10 {Lowest Sensitivity Blue-Sensitive Layer} A blend of slower blue sensitized tabular silver iodobromide emulsion [3.0 mol % iodide, average grain diameter 1.0 microns, average grain thickness 0.08 micron] at 0.22 g/m2 and faster blue sensitized tabular silver iodobromide emulsion [4.1 mol % iodide, average grain diameter 1.0 microns, average grain thickness 0.10 micron] at 0.21 g/m2, yellow dye-forming image coupler Y- 2 at 0.92 g/m2, DIR compound D-4 at 0.047 g/m2, processing sensitivity stabilizing coupler B-1 at 0.003 g/m2, and gelatin at 2.69 g/m2.

Layer 11 {Highest Sensitivity Blue-Sensitive Layer} Blue sensitized low aspect ratio silver iodobromide emulsion [9.0 mol % iodide, average grain diameter 1.05 microns] at 0.75 g/m2, yellow dye-forming image coupler Y-2 at 0.27 g/m2, processing sensitivity stabilizing coupler B-1 at 0.005 g/m2, DIR compound D-4 at 0.043 g/m2, and gelatin at 1.42 g/m2.

Layer 12 {Protective Layer 1} 0.108 g/m2 of dye UV-1, 0.118 g/m2 of dye UV-2, unsensitized silver bromide Lippmann emulsion at 0.22 g/m2, dye CD-1 at 0.005 g/m2, dye MD-1 at 0.001 g/m2, and gelatin at 1.08 g/m2.

Layer 13 {Protective Layer 2} Anti-matte polymethylmethacrylate beads at 0.054 g/m2, and gelatin at 0.89 g/m2.

This film was hardened at coating with 2.0% by weight of total gelatin of hardener H-1. Surfactants, coating aids, scavengers, and stabilizers were added to the various layers of this sample as is commonly practiced in the art.

Photographic recording material Photographic Sample 102 was prepared in the same manner as Sample 101 except that red absorber dye SOL-C1 was added to Layer 1 at 0.029 g/m2, green absorber dye SOL-M1 was added to Layer 6 at 0.044 g/m2, and blue absorber dye SOL-Y1 was added to Layer 11 at 0.135 g/m2.

Photographic recording material Photographic Sample 103 was prepared in the same manner as Sample 102 except that the highest sensitivity blue sensitive emulsion of layer 11 was replaced with a blue sensitized tabular silver iodobromide emulsion [4.1 mol % iodide, average grain diameter 3.0 microns, average grain thickness 0.12 micron] at 0.75 g/m2.

The compounds employed in this film have the structures listed below.

C-1

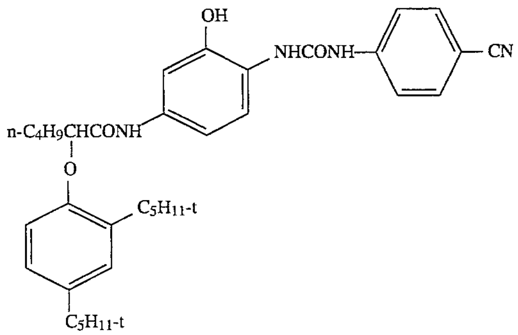

M-1

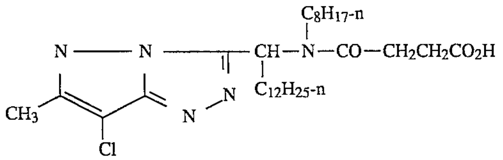

M-2

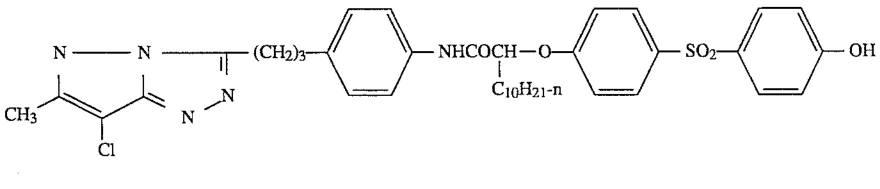

-continued

Y-2

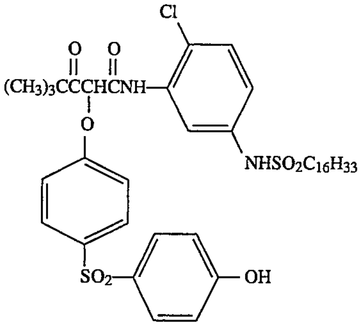

S-1

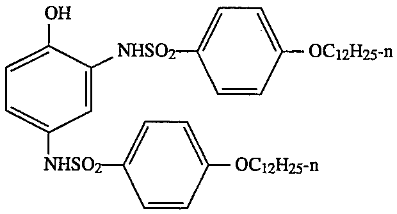

UV-1

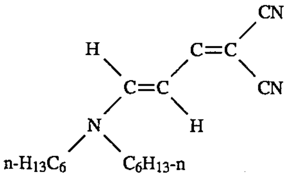

UV-2

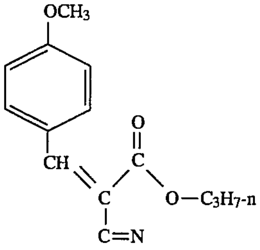

H-1

$CH_2(SO_2CH{=}CH_2)_2$

COMPARATIVE FILM MTF EXAMPLE 2

Samples of Photographic Samples 101–103, as well as samples of comparative commercial films A and B (A is KODAK GOLD PLUS 400 Film, and B is KODAK GOLD PLUS 200 Film), were individually exposed using white light to sinusoidal patterns to determine the MTF (modulation transfer function) response as a function of spatial frequency in the film plane. Specific details of this exposure and its evaluation can be found in R. L. Lamberts and F. C. Eisen, "A System for the Automated Evaluation of Modulation Transfer Functions of Photographic Materials", in the Journal of Applied Photographic Engineering, Vol. 6, pages 1–8, February 1980. The exposed samples were then processed using a color negative process, the KODAK C-41 process, as described in the British Journal of Photography Annual of 1988 in pages 196–198 (KODAK is a trademark of the Eastman Kodak Company, U.S.A.). The bleach used in the process was modified so as to contain 1,3 propylene diamine tetraacetic acid. The MTF of the processed samples was characterized as described in the above reference. Additionally the photographic sensitivity and useful latitude of the samples was determined as described earlier.

The photographic sensitivities, as ISO speeds, and green density MTF response of these five film samples at a variety of spatial frequencies are listed in Table 1 below. All of the samples exhibited a useful latitude in excess of 2.5 log E.

TABLE 1

Green density MTF response of photographic samples after a white light exposure and photographic processing.

| | | Green Density MTF Response | | | | | |
|---|---|---|---|---|---|---|---|
| Sample[a] | ISO Speed | 5 lpm | 10 lpm | 15 lpm | 20 lpm | 25 lpm | 30 lpm |
| A | 400 | 1.03 | 1.09 | 1.08 | 1.03 | 0.94 | 0.85 |
| B | 200 | 1.12 | 1.18 | 1.23 | 1.21 | 1.11 | 1.06 |
| 101 | 370 | 1.08 | 1.14 | 1.17 | 1.16 | 1.09 | 0.96 |
| 102 | 231 | 1.10 | 1.22 | 1.30 | 1.31 | 1.29 | 1.16 |
| 103 | 229 | 1.12 | 1.26 | 1.37 | 1.38 | 1.31 | 1.22 |

COMPARATIVE CAMERA, FILM AND PRINTING EXAMPLE 3

An imaging system performance evaluation was carried out using the MTF percent response for samples 101 through 103 described above. The MTF properties of representative commercial, non-single lens reflex pocket cameras of good quality were determined through optical testing employing square wave target measurement. The green light MTF value was about 0.69 at 20 lines per millimeter (lpm). In a similar manner, a representative commercial optical printer lens MTF response curve was produced. In addition, the MTF response of typical reflection viewing color photographic paper recording material was determined by contact printing with a sinusoidal target, processing, and analyzing its density response. The green density MTF response of the color print recording material for Samples 101–103 with various image area sizes and various display print sizes was determined employing the above common factors. The interrelationships between origination format and display size were characterized by their magnification requirements on the negative working material. These results are shown in Table 2. It will be appreciated that the human eye shows maximum MTF response at about 5 lpm, and that a 5-percent change in MTF response would be visually distinguishable to 50 percent of the viewers in a side-by-side comparison.

TABLE 2

| Example | Sample | Format (mm) | Print Size (cm) | Magnification (x) | Print-through MTF at 5 lpm | Relative Change (%) |
|---|---|---|---|---|---|---|
| 1 | 101 (Comp.) | 102 × 127 ($129.5\ cm^2$) | 8.9 × 12.7 | 1.12 | 0.435 | — |
| 2 | 102 (Inv.) | 102 × 127 ($129.5\ cm^2$) | 8.9 × 12.7 | 1.12 | 0.454 | 4.4 |
| 3 | 103 (Inv.) | 102 × 127 ($129.5\ cm^2$) | 8.9 × 12.7 | 1.12 | 0.460 | 5.7 |
| 4 | 101 (Comp.) | 45 × 60 ($27.0\ cm^2$) | 8.9 × 12.7 | 2.42 | 0.373 | — |
| 5 | 102 (Inv.) | 45 × 60 ($27.0\ cm^2$) | 8.9 × 12.7 | 2.42 | 0.409 | 9.7 |
| 6 | 103 (Inv.) | 45 × 60 ($27.0\ cm^2$) | 8.9 × 12.7 | 2.42 | 0.420 | 12.6 |
| 7 | 101 (Comp.) | 24 × 36 ($8.64\ cm^2$) | 10.2 × 15.2 | 4.44 | 0.244 | — |
| 8 | 102 (Inv.) | 24 × 36 ($8.64\ cm^2$) | 10.2 × 15.2 | 4.44 | 0.283 | 16.0 |
| 9 | 103 (Inv.) | 24 × 36 ($8.64\ cm^2$) | 10.2 × 15.2 | 4.44 | 0.293 | 20.1 |
| 10 | 101 (Comp.) | 24 × 36 ($8.64\ cm^2$) | 10.2 × 27.9 | 7.44 | 0.099 | — |
| 11 | 102 (Inv.) | 24 × 36 ($8.64\ cm^2$) | 10.2 × 27.9 | 7.44 | 0.121 | 21.9 |
| 12 | 103 (Inv.) | 24 × 36 ($8.64\ cm^2$) | 10.2 × 27.9 | 7.44 | 0.130 | 30.9 |
| 13 | 101 (Comp.) | 18 × 24 ($4.32\ cm^2$) | 10.2 × 15.2 | 6.86 | 0.119 | — |
| 14 | 102 (Inv.) | 18 × 24 ($4.32\ cm^2$) | 10.2 × 15.2 | 6.86 | 0.144 | 21.0 |
| 15 | 103 (Inv.) | 18 × 24 ($4.32\ cm^2$) | 10.2 × 15.2 | 6.86 | 0.155 | 30.3 |

From Table 2 it is apparent that the Samples 102 and 103, both of which have green density MTF values of above 1.25 for spatial frequencies in the range of 15 to 25 lpm after imagewise exposure and processing, when employed with a lens having a green light MTF value of less than about 0.8 at a spatial frequency of 20 lpm enable both a very substantial and surprisingly large improvement in the final print image sharpness quality, relative to the comparative control, Sample 101. Here the imaging system magnification demand reaches and exceeds about 4.4 power when the exposed image area of said film is less than about 9 $cm^2$.

COMPARATIVE CAMERA, FILM AND PRINTING EXAMPLE 4

Additional portions of samples 101, 102, 103, A and B were spooled into 35 mm cartridges and loaded into individual panoramic single-use cameras fitted with a 25 mm f/12 taking lens and a shutter means enabling exposure at 1/125 sec. This lens exhibited a green light MTF value of 0.48 at a spatial frequency of 20 lpm and enables exposure of an image area of each film of about 5.0 $cm^2$. The camera further comprised means for advancing film samples so as to allow the exposure of about 12 different scenes on a single roll of film.

Scenic photography was carried out, and the exposed photographic recording materials were subjected to color negative processing using the C-41 process employing a bleach modified as above. The color negative films were printed onto color photographic paper in a format of 10.2× 27.9 cm at circa 7.4 power to precisely equal densities. The prints were viewed at a distance of 25 cm and were evaluated side-by-side for their sharpness in a ranking system employing five quality intervals: poor, fair, good, very good, and excellent. The functional ISO (International Standards Organization) speeds of these photographic films and their print sharpness rating are shown in Table 3.

TABLE 3

| Run | Sample | ISO Speed | Print Sharpness Rating |
|---|---|---|---|
| 1 | A (Comp.) | 400 | Poor |
| 2 | B (Comp.) | 200 | Fair |
| 3 | 101 (Comp.) | 370 | Fair |
| 4 | 102 (Inv.) | 231 | Very Good |
| 5 | 103 (Inv.) | 229 | Very Good |

From Table 3 it is apparent that the Samples 102 and 103, both of which have green density MTF values of above 1.25 for spatial frequencies in the range of 15 to 25 lpm after imagewise exposure and processing, when employed with a lens having a green light MTF value of less than about 0.8 at a spatial frequency of 20 lpm, enable both a very substantial and surprisingly large improvement in the final print image quality, relative to the comparative samples A, B and 101, as the imaging system magnification demand of about 7.4 power occurs when the image area of said film was about 5 $cm^2$.

The invention has been described in detail with particular reference to preferred embodiments thereof, but it will be understood that variations and modifications can be effected within the spirit and scope of the invention.

We claim:

1. A camera comprising:

a film container;

a color negative film contained in said film container which has a green density MTF value of above 1.25 for a spatial frequency in the range of 15 to 25 lines/mm after imagewise exposure and processing;

a taking lens mounted on said film container to expose said film, said taking lens having a green light MTF value of less than about 0.8 at a spatial frequency of 20 lines/mm;

said color negative film comprising a red light sensitive color record, a green light sensitive color record and a blue light sensitive color record, and having a photographic sensitivity of greater than ISO 100.

2. A camera according to claim 1 wherein said taking lens exposes an image area of said film of less than about 9 $cm^2$.

3. A camera according to claim 1 wherein said taking lens exposes an image area of said film of less than about 8 $cm^2$.

4. A camera according to claim 1 wherein said taking lens exposes an image area of said film of less than about 7 $cm^2$.

5. A camera according to claim 1 subject to the proviso that when a negative image of about 9 $cm^2$ area as provided by said camera utilizing a taking lens having a green light MTF value of about 0.7 at a spatial frequency of 20 lines/mm, printed through with an enlargement factor of about 4.4 times to provide a viewable image larger than about 155 $cm^2$, such enlarged print material exhibits a green density MTF of greater than 0.26 at 5 lines per mm.

6. A camera according to claim 1 wherein said green light sensitive color record comprises a green light sensitive tabular grain emulsion having an aspect ratio greater than about 2.

7. A camera according to claim 6 wherein said tabular grain emulsion has an aspect ratio greater than about 5.

8. A camera according to claim 6 wherein said tabular grain emulsion has an aspect ratio greater than about 10.

9. A camera according to claim 6 wherein said green light sensitive tabular grain emulsion has a grain thickness of between 0.11 and 0.13 microns or a grain thickness of between 0.23 and 0.25 microns.

10. A camera according to claim 1 wherein said green light sensitive color record comprises two, three or more partial color records differing in sensitivity to green light.

11. A camera according to claim 1 wherein said red light sensitive color record comprises a tabular grain silver halide emulsion spectrally sensitized to red light and having an aspect ratio greater than about 2.

12. A camera according to claim 1 wherein said red light sensitive color record comprises two, three or more partial color records differing in sensitivity to red light.

13. A camera according to claim 11 wherein said green light sensitive color record is positioned further from said support than said red light sensitive color record and said red light sensitive tabular grain emulsion has a grain thickness of between 0.11 and 0.13 microns or a grain thickness of between 0.23 and 0.25 microns.

14. A camera according to claim 1 wherein said film comprises a blue light sensitive color record comprising a tabular grain silver halide emulsion spectrally sensitized to blue light and having an aspect ratio greater than about 2.

15. A camera according to claim 1 where said blue light color record comprises two, three or more partial color records differing in sensitivity to blue light.

16. A camera according to claim 14 where said blue light sensitive color record is positioned further from said support than said green light sensitive color record and said blue light sensitive tabular grain emulsion has a grain thickness of between 0.08 and 0.10 microns or a grain thickness of between 0.19 and 0.21 microns.

17. A camera according to claim 1 wherein said lens is a single aspherical lens.

18. A camera according to claim 17 wherein an exposure time enabled by a shutter means is less than about 1/100 sec.

19. A camera according to claim 1 wherein the color negative film has a sensitivity greater than about ISO 125.

20. A camera according to claim 1 wherein the color negative film has a sensitivity greater than about ISO 160.

21. A camera according to claim 1 wherein the color negative film has a sensitivity of between ISO 200 and ISO 800.

22. A camera according to claim 1 wherein said film comprises a light absorbing material in an amount and location sufficient to reduce the light sensitivity of said green light sensitive color record by at least 5%.

23. A camera according to claim 1 wherein said film comprises a light absorbing material in an amount and location sufficient to reduce the light sensitivity of said green light sensitive color record by at least 20%.

24. A camera according to claim 1 wherein said film comprises a light absorbing material in an amount and location sufficient to reduce the sensitivity of said green light sensitive color record by at least 40%.

25. A camera according to claim 1 wherein said film comprises a light absorbing material in an amount and location sufficient to reduce the sensitivity of said red light sensitive color record by at least 5%.

26. A camera according to claim 1 wherein said film comprises a light absorbing material in an amount and location sufficient to reduce the sensitivity of said red light sensitive color record by at least 20%.

27. A camera according to claim 1 comprising means enabling sequential exposure of more than one image on distinct regions of said color negative film.

28. A camera according to claim 1 comprising means enabling sequential exposure of ten or more images on distinct regions of said color negative film.

29. A camera according to claim 1 wherein said taking lens has a green light MTF value of about 0.7 or less at a spatial frequency of 20 lines/mm.

30. A camera according to claim 1 wherein said taking lens has a green light MTF value of about 0.6 or less at a spatial frequency of 20 lines/mm.

31. A camera according to claim 1 wherein said taking lens has a focal length of between 10 and 100 mm.

32. A camera according to claim 1 wherein said taking lens has a focal length of between 15 and 60 mm.

33. A camera according to claim 1 wherein said taking lens has a focal length of between 20 and 40 mm.

34. A camera according to claim 1 subject to the proviso that when a negative image of about 5 $cm^2$ area is provided by said camera utilizing a taking lens having a green light MTF value of about 0.7 at a spatial frequency of 20 lines/mm, printed through with an enlargement factor of about 7 times to provide a viewable image larger than about 200 $cm^2$, such enlarged exposure exhibits a green light MTF of greater than 0.11 at 5 lines per mm.

35. A camera according to claim 1 wherein said film comprises at least one DIR compound.

36. A camera according to claim 1 wherein said film has an exposure latitude greater than about 1.8 log E.

37. A camera according to claim 1 wherein said film has an exposure latitude greater than about 2.1 log E.

38. A camera according to claim 1 wherein said film has a green density MTF value of above 1.3 for a spatial frequency in the range of 15 to 25 lines per mm after imagewise exposure and processing.

39. A camera comprising:

a film container;

a color negative film contained in said film container which has a green density MTF value of above 1.15 for a spatial frequency in the range of 10 to 30 lines per mm after imagewise exposure and processing;

a taking lens mounted on said film container to expose said film, said taking lens having a green light MTF value of less than about 0.8 at a spatial frequency of 20 lines per mm;

said color negative film comprising a red light sensitive color record, a green light sensitive color record and a blue light sensitive color record, and having a photographic sensitivity of greater than ISO 125 and an exposure latitude greater than 2.1 log E.

40. A camera comprising:

a film container;

a color negative film contained in said film container which has a green density MTF value of above 1.2 for a spatial frequency in the range of 10 to 25 lines per mm after imagewise exposure and processing;

a taking lens mounted on said film container to expose said film, said taking lens having a green light MTF value of less than about 0.8 at a spatial frequency of 20 lines per mm;

said color negative film comprising a red light sensitive color record, a green light sensitive color record and a blue light sensitive color record, and having a photographic sensitivity of greater than ISO 125 and an exposure latitude greater than 2.1 log E.

* * * * *